US007765133B1

(12) United States Patent
Edelstein et al.

(10) Patent No.: US 7,765,133 B1
(45) Date of Patent: *Jul. 27, 2010

(54) SYSTEM FOR FACILITATING TRADE PROCESSING AND TRADE MANAGEMENT

(75) Inventors: P. Howard Edelstein, Newton, MA (US); Christopher J. Walsh, Kingston, MA (US); Christopher G. Smith, Kent (GB); Gary S. Foster, Arlington, MA (US); Peter J. Tierney, Kingston, MA (US)

(73) Assignee: Omgeo LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/504,803

(22) Filed: Feb. 16, 2000

(51) Int. Cl.
G06Q 40/00 (2006.01)

(52) U.S. Cl. .............................. 705/35; 705/37; 705/44; 705/42

(58) Field of Classification Search .................. 705/37, 705/35, 44, 42
See application file for complete search history.

(56) References Cited

U.S. PATENT DOCUMENTS

| 3,573,747 | A | * | 4/1971 | Adams | 340/172.5 |
|---|---|---|---|---|---|
| 3,581,072 | A | * | 5/1971 | Nymeyer | 235/152 |
| 4,346,442 | A | | 8/1982 | Musmanno | 364/408 |
| 4,376,978 | A | | 3/1983 | Musmanno | 364/408 |
| 4,412,287 | A | * | 10/1983 | Braddock, III | 364/408 |
| 4,454,414 | A | * | 6/1984 | Benton | 235/379 |
| 4,571,463 | A | | 2/1986 | Shefler | 179/90 B |
| 4,674,044 | A | * | 6/1987 | Kalmus et al. | 364/408 |
| 4,677,552 | A | * | 6/1987 | Sibley, Jr. | 364/408 |
| 4,694,397 | A | | 9/1987 | Grant et al. | 364/408 |
| 4,774,663 | A | | 9/1988 | Musmanno et al. | 364/408 |
| 4,799,156 | A | * | 1/1989 | Shavit et al. | 364/401 |
| 4,823,265 | A | * | 4/1989 | Nelson | 364/408 |
| 4,903,201 | A | * | 2/1990 | Wagner | 364/408 |
| 4,949,248 | A | | 8/1990 | Caro | 364/200 |
| 4,980,826 | A | | 12/1990 | Wagner | 364/408 |
| 5,101,353 | A | | 3/1992 | Lupien et al. | 364/408 |
| 5,136,501 | A | | 8/1992 | Silverman et al. | 364/408 |
| 5,220,501 | A | | 6/1993 | Lawlor et al. | 364/408 |
| 5,262,942 | A | | 11/1993 | Earle | 364/408 |
| 5,285,383 | A | | 2/1994 | Lindsey et al. | 364/408 |
| 5,497,317 | A | | 3/1996 | Hawkins et al. | 364/408 |
| 6,029,146 | A | * | 2/2000 | Hawkins et al. | 705/35 |
| 6,247,000 | B1 | * | 6/2001 | Hawkins et al. | 705/37 |
| 6,477,509 | B1 | * | 11/2002 | Hammons et al. | 705/27 |

FOREIGN PATENT DOCUMENTS

| GB | 2161003 A | | 1/1986 |
|---|---|---|---|
| GB | 2210714 A | | 12/1988 |
| WO | WO 97/07475 | * | 2/1997 |

* cited by examiner

*Primary Examiner*—Daniel S Felten
(74) *Attorney, Agent, or Firm*—Schiff Hardin LLP

(57) ABSTRACT

A system for facilitating the processing and settlement of a securities trade is provided. The system includes a computer which receives trade execution information indicative of an executed trade by a first trading party and trade allocation information indicative of an executed trade by a second trading party. The system also includes a database of trading party profiles accessible by the computer, the trading party profiles being indicative of acceptable trade parameters for each trading party. Executing on the computer is a matching program for comparing the trade execution information with the trade allocation information and for determining that a match exists if the trade execution information and the trade allocation information correlate within the acceptable trade parameters supplied in the trading party profiles for the first trading party and the second trading party.

31 Claims, 5 Drawing Sheets

SYSTEM FOR FACILITATING TRADE PROCESSING AND TRADE MANAGEMENT

FIELD OF THE INVENTION

The present invention relates to system for facilitating the processing and settlement of securities trades, and more particularly, to a system which automates and streamlines the trade management process thereby reducing the time and effort involved in processing securities trades while increasing the reliability of the trade management process and keeping all parties to the trade informed about the status of the trade while it is being processed.

BACKGROUND OF THE INVENTION

A variety of systems have been developed for automating portions of the securities trading industry. For example, British patent publications GB 2 161 003 A and GB 2 210 714 A are directed to systems for distributing, processing and displaying financial information. Similarly, U.S. Pat. No. 4,949,248 discloses a local area network for shared access of information services or shared control of applications, aimed particularly at trading rooms of securities firms. Other systems include U.S. Pat. Nos. 4,346,442, 4,376,978 and 4,774,663 which are directed to systems for operating and maintaining securities brokerage-cash management accounts, and U.S. Pat. Nos. 4,674,044, 4,823,265 and 5,101,353 which disclose electronic trade execution systems.

None of the above prior art systems, however, are directed to improving the speed and accuracy of communication of the instructions for exchanging the purchase money and the security to settle an executed trade. Thus, none of the prior art systems adequately speeds trade settlement which is accomplished, if at all, by a patchwork of faxes, telexes, and telephone calls among the trading parties.

Systems for automating the settlement of securities trades and the delivery of trade confirmations have been developed to remedy many of the deficiencies of the prior art systems discussed above. These systems, commonly known as Electronic Trade Confirmation ("ETC") systems, reduce the number of tasks required to confirm a trade, and automate most of the remaining tasks, which tasks would have to be performed manually if such an ETC system were not used. Thus, the ETC systems currently in use reduce the time and effort required to settle a securities trade, as compared to the traditional laborious manual method of sequentially exchanging messages by telephone or telex. However, these prior art ETC systems still suffer from certain deficiencies of their own.

U.S. Pat. No. 5,497,317 discloses a system which is based on a series of messages flowing back and forth between institutions, brokers and custodians. This prior art system thus automates many of the tasks which has previously required human intervention, and therefore reduces the time required to settle trades, typically to within three days of the trade date, so-called "T+3". However, "T+3" has been viewed in the securities trading industry as a transitionary phase, not as an end goal. It is anticipated that the Securities and Exchange Commission will soon require settlement to occur within one day of the trade date ("T+1") and possibly even on the same day as the trade date ("T+0"). The above described prior art device works well for T+3 settlement, but may be susceptible in its manual embodiments to settlement failures in a T+1 or T+0 regime due to the large number of time consuming human interactions required for each settlement. One of these human interactions is confirmation of the final settlement terms according to information standards which are either arbitrary or known only to the parties.

What is desired, therefore, is a system for facilitating the processing and settlement of securities trades which reduces the time required for settlement, which reduces the amount of information required to be input by the parties for each trade, which reduces the number of human interactions in the settlement process, which permits the parties to define settlement standards to automate and thereby speed trade settlements, which provides the parties to the settlement with value added data, which is more reliably capable of achieving settlement within less than three days of the trade date, which permits all parties to a trade to view the status of the trade in real-time, and which is capable of calculating a trade's net amount with minimum input by the trading parties.

SUMMARY OF THE INVENTION

Accordingly, it is an object of the present invention to provide a system for facilitating the processing and settlement of securities trades which reduces the time required for settlement.

Another object of the present invention is to provide a system for facilitating the processing and settlement of securities trades having the above characteristics and which reduces the amount of information required to be input by the parties by making this information available to the system without requiring user input.

A further object of the present invention is to provide a system for facilitating the processing and settlement of securities trades having the above characteristics and which reduces the number of human interactions in the settlement process.

Yet another object of the present invention is to provide a system for facilitating the processing and settlement of securities trades having the above characteristics and which permits the parties to define settlement standards to automate and thereby speed trade settlements.

Still another object of the present invention is to provide a system for facilitating the processing and settlement of securities trades having the above characteristics and which provides the parties to the settlement with value added data used to logically alert users of pertinent information which could affect the settlement of the securities trade.

Yet a further object of the present invention is to provide a system for facilitating the processing and settlement of securities trades having the above characteristics and which is more reliably capable of achieving settlement within less than three days of the trade date.

Still a further object of the present invention is to provide a system for facilitating the processing and settlement of securities trades having the above characteristics and which permits all parties to a trade to view the status of the trade in real-time.

Yet another object of the present invention is to provide a system for facilitating the processing and settlement of securities trades having the above characteristics and which is capable of calculating a trade's net amount with minimum input by the trading parties.

These and other objects of the present invention are achieved by provision of a system for facilitating the processing and settlement of securities trades. The system includes a computer which receives trade execution information indicative of an executed trade by a first trading party and trade allocation information indicative of an executed trade by a second trading party. The system also includes a database of trading party profiles accessible by the computer, the trading party profiles being indicative of acceptable trade parameters for each trading party. Executing on the computer is a matching program for comparing the trade execution information with the trade allocation information and for determining that a match exists if the trade execution information and the trade allocation information correlate within the acceptable trade parameters supplied in the trading party profiles for the first trading party and the second trading party.

Preferably, the trade execution information and the trade allocation information include minimum pairing data, which most preferably comprises an indicator of whether shares are being bought or sold, a trade date, a security identifier and an indicator of the number of shares traded. Executing on the computer is a pairing program for comparing the trade execution information with the trade allocation information and determining that a pairing exists if the minimum pairing data of the trade execution information corresponds to the minimum pairing data of the trade allocation information. When a pairing is found to exist the paired trade execution rot information and trade allocation information are passed to the matching program to determine if a match exists.

Also preferably, the trade execution information includes a first trading party identification and the trade allocation information includes a second trading party identification, and the computer retrieves from the database the trading party profiles based on these first and second trading party identifications.

The computer of the system preferably generates an affirmation if a match is determined to exist, and transmits the affirmation to the trading parties confirming that a match has been detected by the matching program. The affirmation contains all data necessary for settling the trade. Most preferably, the trading party profiles include an indication of a desired affirmation format and protocol, and the system includes a translation program executing on the computer for translating the affirmation generated by the computer into the desired affirmation format and protocol specified in the trading party profiles before transmitting the affirmation to the trading parties.

Preferably, the system also includes a plurality of enrichment databases having enrichment data stored thereon. An enrichment program executing on the computer is provided to enrich the trade execution information and the trade allocation information with enrichment data retrieved from the plurality of enrichment databases. Most preferably, the system included a data management program for allowing the trading parties to access, modify and confirm their trading party profiles and the enrichment databases, and one of the plurality of enrichment databases has commission fees data stored thereon.

Also preferably, the first trading party is a broker and the trade execution information is extracted from an order execution notice received by the computer, and the second trading party is an investment manager and the trade allocation information is extracted from an allocation received by the computer. Most preferably, the system also includes a translation program executing on the computer for extracting the trade execution information from the order execution notice and the trade allocation information from the allocation, and for translating the trade execution information and the trade allocation information into a format usable by the computer.

The invention and its particular features and advantages will become more apparent from the following detailed description considered with reference to the accompanying drawings.

DETAILED DESCRIPTION OF THE INVENTION

Figure 1:
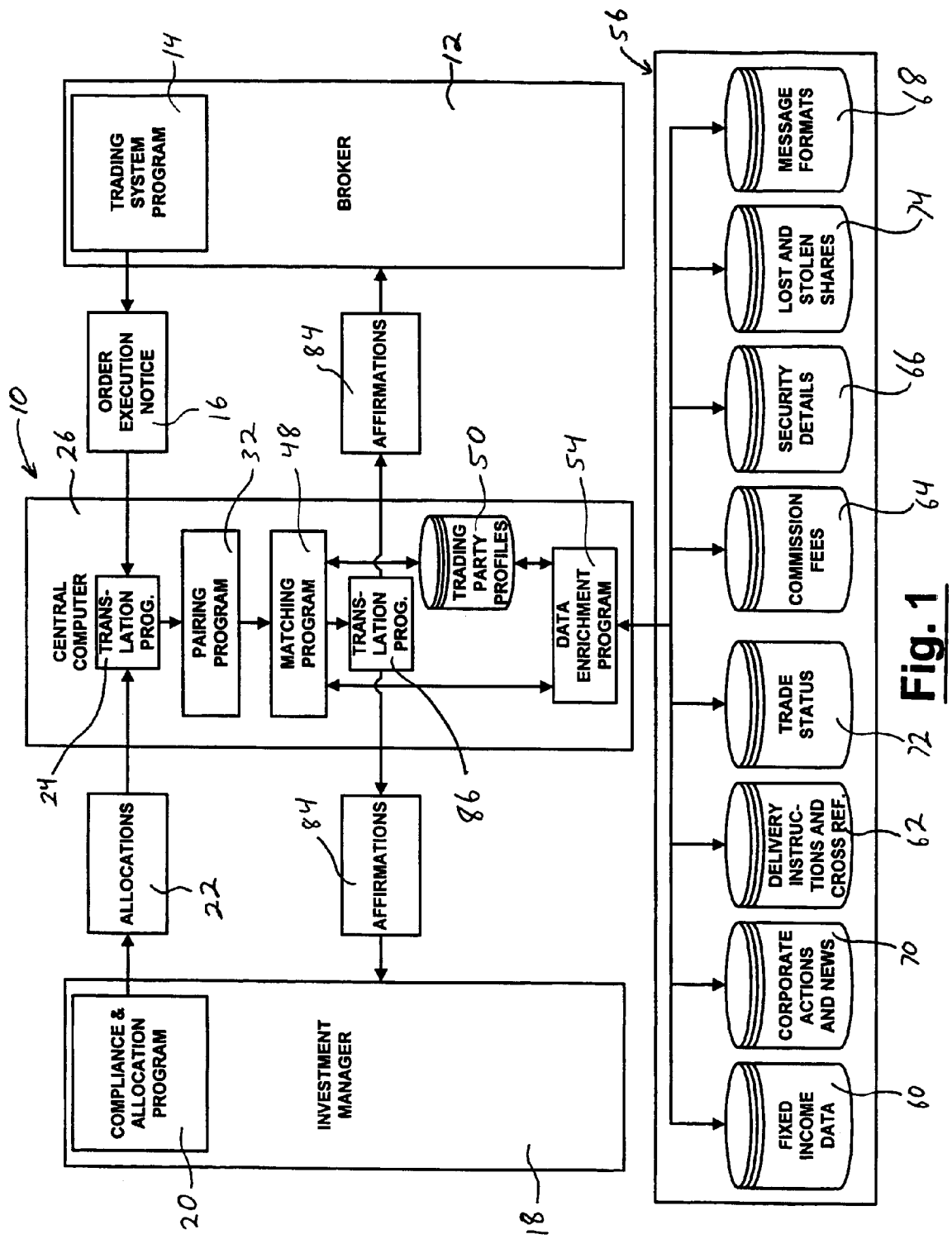
FIG. 1 is a block diagram of a system for facilitating the processing and settlement of securities trades in accordance with the present invention.

Referring first to FIG. 1, a system for facilitating the processing and settlement of securities trades 10 in accordance with the present invention is shown. System 10 receives trade information from two trading parties indicating that a trade has been executed. Typically, one of the trading parties is a broker 12 having a trading system program 14 which supplies trade execution information in the form of an order execution notice 16. The other trading party is typically an investment manager 18 having a compliance and allocation program 20 which supplies trade allocation information in the form of allocations 22. It should be noted, however, that the broker and investment manager situation shown in the Figures and discussed herein is for illustration only, and that the trading parties are not limited to brokers and investment managers. It is envisioned that any individual or institution participating in securities trades may use system 10, so long as two sets of trade information are supplied to the system.

Because there are many trading system programs 14 and compliance and allocation programs 20 which are available, order execution notices 16 and allocations 22 may have any of numerous message formats, (e.g., financial information exchange (FIX), open financial exchange (OFX), etc.) and/or protocols (e.g., systems network architecture (SNA), transmission control protocol/internet protocol (TCP/IP), etc.). For this reason, a translation program 24 executing on the central computer 26 of system 10 is provided. Translation program 24 receives order execution notice 16, extracts trade execution information 28 therefrom, and converts trade execution information 28 into a format which is usable by central computer 26 and the programs executing thereon. Similarly, translation program 24 receives allocations 22, extracts trade allocation information 30 therefrom, and converts trade allocation information 30 into a usable format. Translation program 24 then passes trade execution information 28 and trade allocation information 30 to a pairing program 32 executing on central computer 26. It should be noted that central computer 26 is not limited to a single computer and may comprise a single computer or a system of computers.

Figure 2:
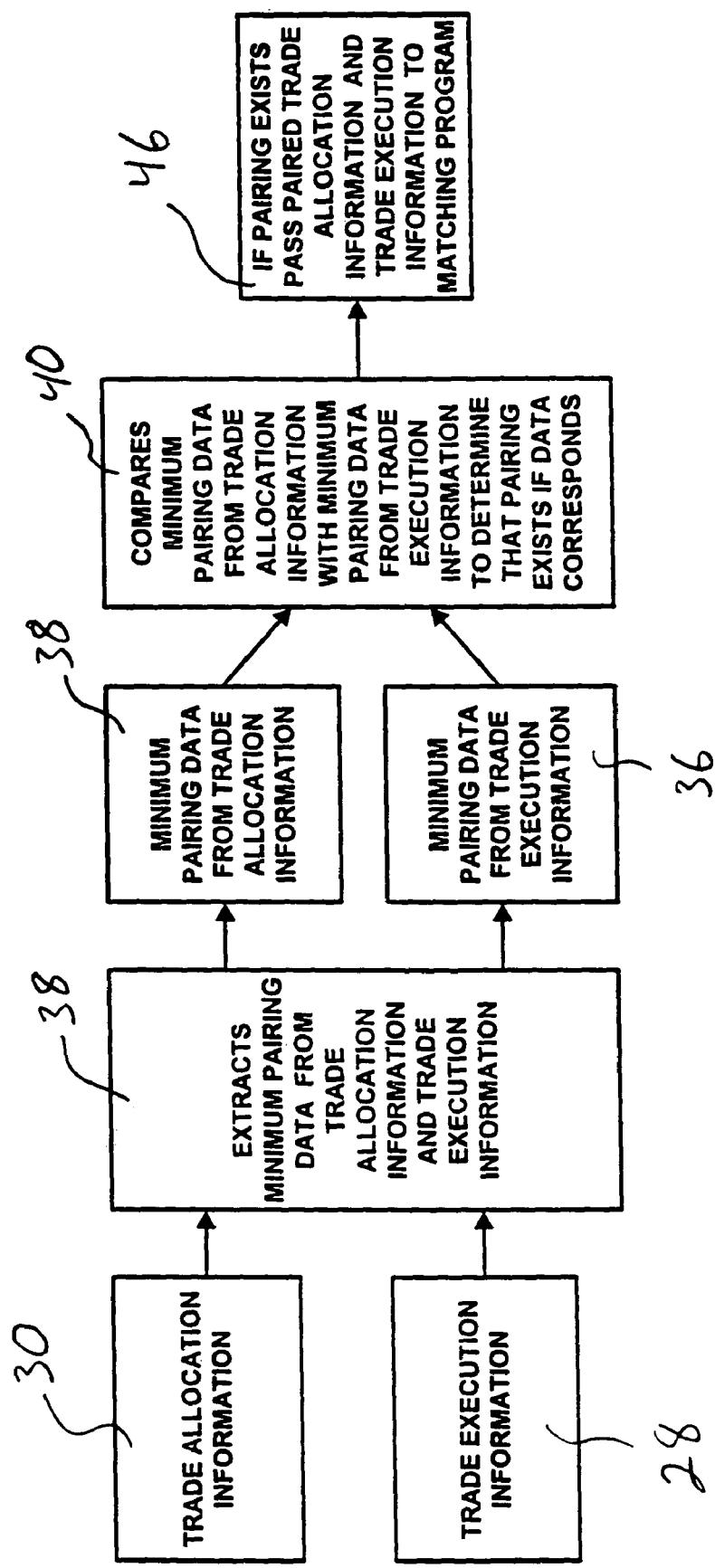
FIG. 2 is a block diagram illustrating the operation of the pairing program of the system for facilitating the processing and settlement of securities trades of FIG. 1.

As best seen in FIG. 2, pairing program 32 receives trade execution information 28 and trade allocation information 30, and extracts from each a set of minimum pairing data 34, 36

(step illustrated as block 38). Minimum pairing data 34, 36 comprise the essential and most basic characteristics of a trade, such as an indicator of whether shares are being bought or sold, the trade date, an identifier of the security, and the number of shares traded. Minimum pairing data 34 from trade execution information 28 and minimum pairing data 36 from trade allocation information 30 are then compared at block 40 and a pairing is found to exist if the minimum pairing data 34, 36 correspond with each other. For example, if trade execution information 28 indicates that 100 shares of IBM were sold on Jan. 1, 1999, and trade allocation information 30 indicates that 100 shares of IBM were bought on Jan. 1, 1999, a pairing would be found to exist. If a pairing is found to exist, paired trade execution information 42 and paired trade allocation information 44 are passed at block 46 to a matching program 48 executing on central computer 26. If a pairing does not occur, system 10 compares trade execution information 28 with other sets of trade allocation information and compares trade allocation information 30 with other sets of trade execution information. If a pairing does not occur after a predetermined time period, the trading party is advised that no pairing has occurred and that the trade has not been settled.

Figure 3:
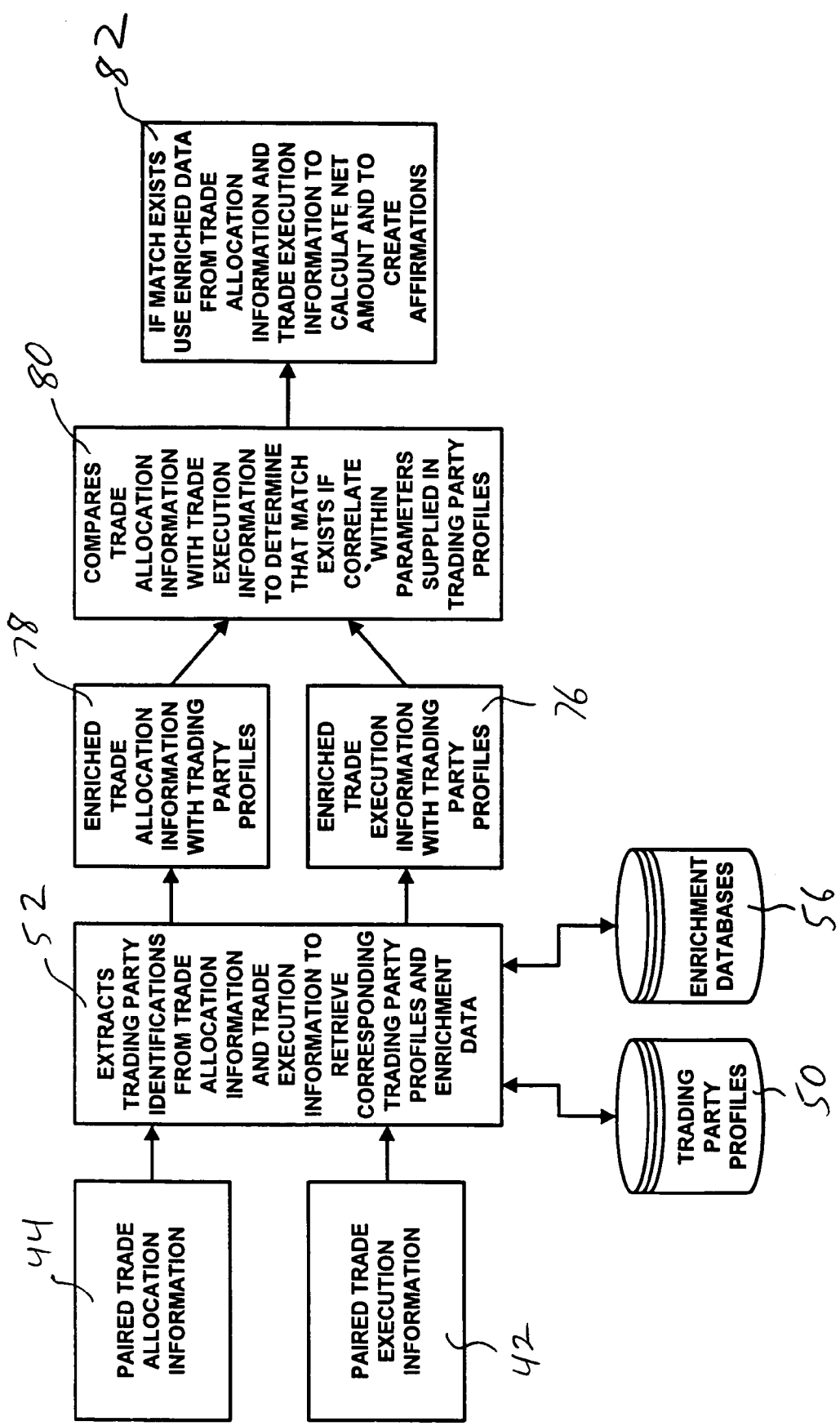
FIG. 3 is a block diagram illustrating the operation of the matching program of the system for facilitating the processing and settlement of securities trades of FIG. 1.

As shown in detail in FIG. 3, paired trade execution information 42 and paired trade allocation information 44 are received by matching program 48. Matching program 48 extracts trading party identifications from paired trade execution information 42 and paired trade allocation information 44, and uses these trading party identifications to query a trading party profiles database 50 to retrieve trading party profiles for each party (step illustrated as block 52). The trading party profiles, which are discussed more fully below, include acceptable trade parameters for each party. The acceptable trade parameters are fully configurable by each trading party for each individual trade and may be based on any of a number of various criteria. Examples of these criteria on which acceptable trade parameters may be specified include, without limitation, counterparty identity, security identity, type of currency, bargain conditions, settlement date, agency, average price, net commission, price, gross consideration, commission amount, commission percentage, commission rate per share, contract gross consideration, commission for the contract, local tax, local fee, other fees, issuing firm charge, net consideration, and accrued interest. The acceptable trade parameters may specify simply whether or not the satisfaction of a criteria is necessary for a match to occur. For example, the trading party may specify that a match can occur only if settlement is to be made in the specific currency identified in its trade execution or trade allocation information. For other criteria which are based on numerical values, the trading party may specify a range, typically expressed either as an absolute value or in a percent tolerance, for which matching will occur. For example, the trading party may specify that for a match to occur, the commission amount must be within plus or minus $100.00 of the commission amount value identified in its trade execution or trade allocation information. Alternately, the trading party may specify that for a match to occur, the commission amount must be within plus or minus 5% of the commission amount value identified in its trade execution or trade allocation information. Of course, the trading party may specify that only a zero tolerance is acceptable, which would require that the criteria correlate exactly for a match to occur. In addition, the trading party may not be concerned about one or more criteria, and may specify that those criteria not be examined to determine if a match exists. It should be noted that preferably, preference is given to the trading party ordering the trade. Therefore, if the data supplied in enriched trade execution information with appended trading party profiles 76 conflicts with the data supplied in enriched trade allocation information with appended trading party profiles 78, the data supplied in enriched trade allocation information with appended trading party profiles 78 would be used. Thus, in the case of a trade between an investment manager and a broker, the preferences of the investment manager would control.

The trading party profiles may be configured to depend on the other party to the paired trade or may be independent of the other trading party. For example, a trading party may configure a first profile having a first set of matching criteria if the other party to the trade is Company A, a second profile having a second set of matching criteria if the other party to the trade is Company B, and a generic default profile having a third set of matching criteria if the other party to the trade is one for which no specific profile has been entered, Company C or Company D for example.

Also at step 52, matching program 48 queries a data enrichment program 54, which in turn queries a plurality of enrichment databases 56 to retrieve data relevant to the trading parties and to the trade. Enrichment databases 56 may provide information which remains relatively constant from one trade to the next, and which would otherwise have to be entered by the trading parties for numerous trades, such as fixed income data 60, delivery instructions and cross references 62, commission fees 64, security details 66 and message formats 68. Traditionally, such information would have to be entered by the trading parties for each trade through "allocations" and "confirmations." Enrichment databases 56 may also provide information which is related to the trade or the security being traded, and which the trading party may be desirous to know about during or after the trade settlement process, such as corporate actions and news 70, trade status 72 and lost and stolen shares 74. Thus, enrichment databases 56 supplement the information supplied by the trading parties with value added data and reduce the amount of information that must be entered by the trading parties for each trade. It should be understood that enrichment databases 56 may or may not be co-located with central computer 26, and may for example comprise databases maintained by independent organizations and accessed by central computer 26.

The enriched trade execution information with appended trading party profiles 76 and the enriched trade allocation information with appended trading party profiles 78 are then compared by matching program 48 at block 80 to determine if a match exists. A match will be found to exist if the data supplied in enriched trade execution information with appended trading party profiles 76 correlates with the data supplied in enriched trade allocation information with appended trading party profiles 78 within the parameters supplied with the trading party profiles for each party. An illustrative example follows. Enriched trade execution information with appended trading party profiles 76 indicates that shares of IBM were bought at $1000.00 US with a $100.00 US commission and that matching criteria are security identification and price within 5%. Enriched trade allocation information with appended trading party profiles 78 indicates that shares of IBM were bought at $1010.00 US with a $98.00 US commission and that matching criteria are security identification and commission amount within 5%. A match would occur in this instance because all matching criteria are satisfied. The security identification matches exactly, the two price amounts are within 5% of each other, and the two commission amounts are within 5% of each other.

When a match is found to exist, matching program at block 82 uses enriched trade execution information with appended trading party profiles 76 and enriched trade allocation information with appended trading party profiles 78 to calculate the net amount of the trade. It should be noted that the calculation of the net amount has been accomplished by using information stored on enrichment databases 56, without requiring the manual entry of this information by the parties through, as has traditionally been done through manual entry of "allocations" and "confirmations." Matching program 82 also uses enriched trade execution information with appended trading party profiles 76 and enriched trade allocation information with appended trading party profiles 78 to generate affirmations 84, which include all information necessary to settle the trade and the value added data retrieved from enrichment databases 56. Because trading parties may use many different computer systems, system 10 includes translation program 86 which translates affirmations 84 into a message format and protocol readable by the trading parties. The format and protocol into which affirmations 84 are translated may have been retrieved, for example, from trading party profiles database 50 or from message formats database 68 during data enrichment.

Figure 4:
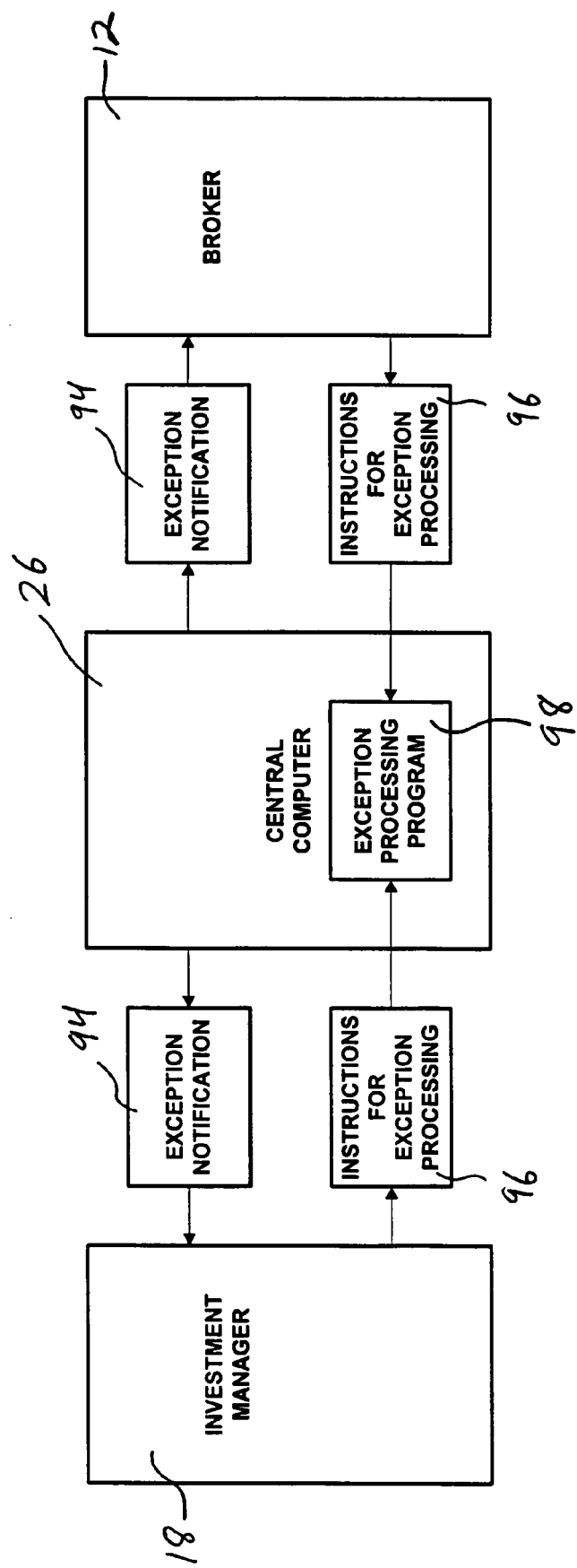
FIG. 4 is a block diagram illustrating of portion of the system for facilitating the processing and settlement of securities trades showing exception processing; and, FIG. 5 is a block diagram of a portion of the system for facilitating the processing and settlement of securities trades of FIG. 1 showing how data management is performed.

Referring now to FIG. 4, if, however, paired trade execution information 42 and paired trade allocation information 44 are found not to match, an exception notification message 94 is generated and transmitted to the trading parties involved. At this point, manual human intervention is required. The trading parties may decide, for example, to reject the trade, to force the match if it was that party's criteria which was not satisfied, or to change some of the information to satisfy the other party's criteria. Instructions for exception processing 96 are the sent by the trading parties to an exception processing program 98 executing on central computer 26. Exception processing program 98 then executes the trading parties' instructions regarding how to process the trade. For example, exception processing program may terminate processing of the trade, continue processing the trade despite the unmatched criteria, of modify paired trade execution information 42 and/or paired trade allocation information 44 to meet the parties matching criteria and then continue to process the trade, depending on the instructions for exception processing received from the trading parties. It should be understood that this failed match situation is the exception and not the norm, and that in the normal situation where a match occurs, no human intervention is required.

In addition to acceptable trade parameters, the trading party profiles may include additional data relating to each trading party. Such data, which may include information such as data enrichment rules and transaction processing rules, relates to the way in which system 10 handles the settlement process. For example, the data enrichment rules may specify which databases are to be accessed for enrichment with value added data, or may specify a database from which to extract information which was not supplied in the trade information for a particular trade. The trade processing rules may relate to the processes system 10 is to take to settle a trade (e.g., use old message based system for a specific trade instead of matching, or accept information supplied by other trading party for specific criteria) or may relate to the way system 10 is to communicate with the trading party (e.g., want affirmations to be sent to multiple locations). Thus, these data enrichment rules and trade processing rules allow trading parties great flexibility in selecting precisely how system 10 functions with respect to each individual trade and allow the trading parties to seamlessly integrate system 10 into their existing systems. Furthermore, enrichment databases 56 and data enrichment rules provide a platform for connecting to databases of pre-agreed upon information and/or information which is standard in the industry.

As the system receives and processes information, the status and details of the state of the trade is continually monitored and stored on trade status database 72 or in some other form of non-volatile memory. This allows the trading parties to view the status of trades on a real-time basis. This also allows the system to recover the trade related information and continue processing all pending trades in the event of a system failure.

Figure 5:
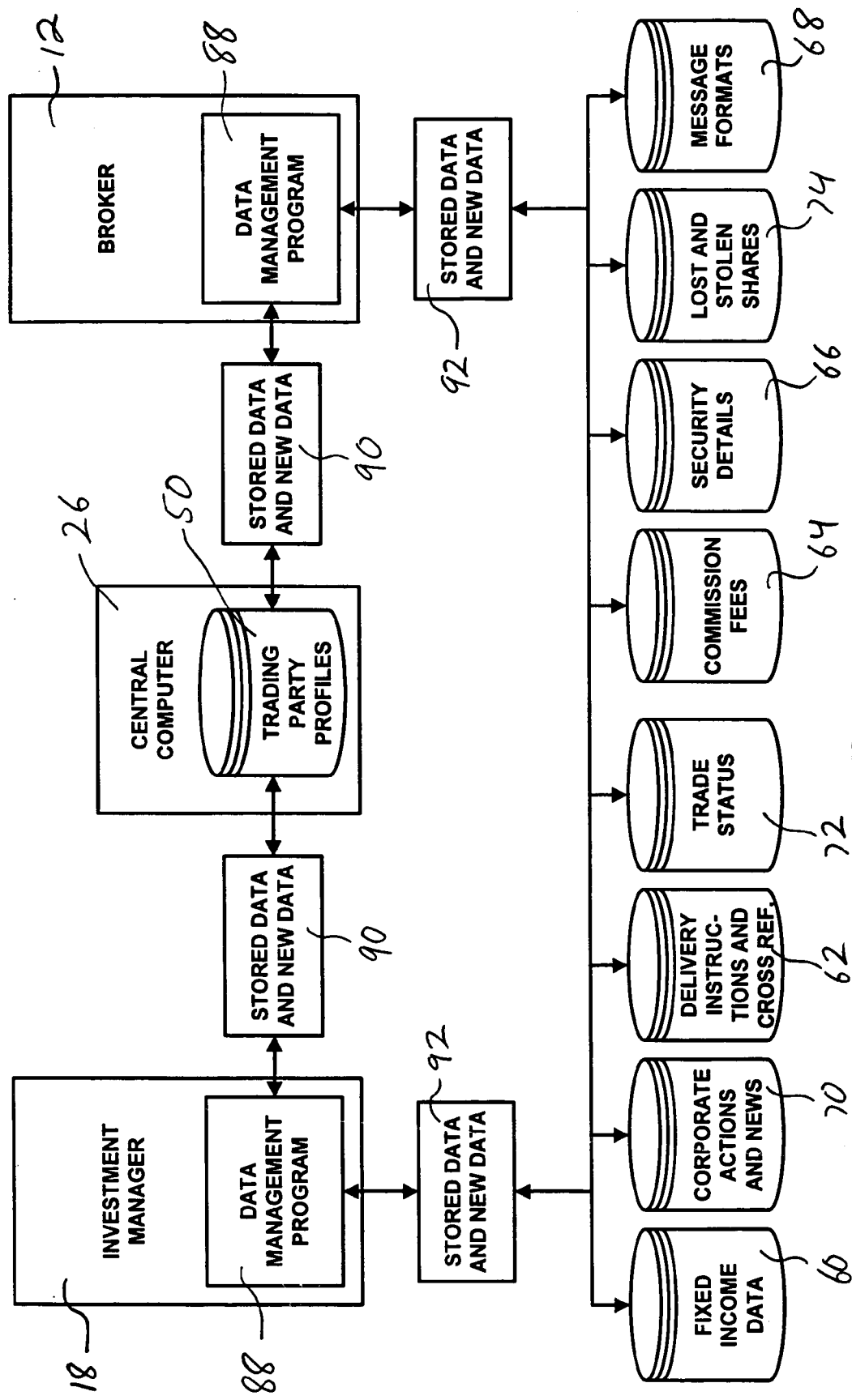

Referring now to FIG. 5, investment manager 18 and broker 12 may access, modify and confirm their trading party profiles stored on trading party profiles database 50 and the enrichment data stored on enrichment databases 56 using a data management program 88. Data management program 88 may be used to retrieve and edit stored data on trading party profiles database 50 and to supplement trading party profiles database 50 with new data (indicated as 90). Similarly, data management program 88 may be used to retrieve and edit stored data on many of enrichment databases 56 and to supplement these enrichment databases 56 with new data (indicated as 92). In addition, enrichment databases may be accessed, modified and confirmed by other authorized parties. For example, corporate actions and news database 70 may be continuously modified by a corporate news service so that database 70 contains up-to-the-minute information. Preferably, when a trading party modifies its profile on trading party profile database 50 or any of enrichment databases 56, any other parties which may be affected my such modification will be notified of the modification by data management program 88.

It should be understood from the above detailed description that all data and message flows between the system and each trading party may be asynchronous. In other words, unlike prior art systems, which rely on a sequential series of messages exchanged back and forth between the system and the trading parties, the present invention provides a system whereby the system communicates with each trading party independently of the other. Such a system greatly increases the speed at which trades are settled. It should also be understood that, while the present invention greatly aids in the settlement of securities transactions, the system does not actually perform trade settlements itself. It should also be understood that the configurability of trading parameters and message formats allows great flexibility in the interface with the trading parties. For example, one party to a trade may configure the system as described above with respect to the preferred embodiment. However, the other party may be accustomed to using a prior art system, for example, the system disclosed in U.S. Pat. No. 5,497,317, hereby incorporated by reference, and desire to receive messages as described therein. Such a user may configure its trading parameters and message formats as described above to emulate such a system.

The present invention, therefore, provides a system for facilitating the processing and settlement of securities trades which reduces the time required for settlement, which reduces the amount of information required to be input by the parties for each trade, which reduces the number of human interactions in the settlement process, which permits the parties to define settlement standards to automate and thereby speed trade settlements, which provides the parties to the settlement with value added data, which is more reliably capable of achieving settlement within less than three days of the trade date, which permits all parties to a trade to view the status of the trade in real-time, and which is capable of calculating a trade's net amount with minimum input by the trading parties.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for facilitating the processing and management of a securities trade comprising:
   a computer;
   trade execution information supplied by a first trading party and received by said computer, said trade execution information indicative of an executed trade by the first trading party and comprising party supplied data elements concerning conditions of the executed trade itself;
   trade allocation information supplied by a second trading party and received by said computer, said trade allocation information indicative of an ordered trade by the second trading party and comprising party supplied data elements concerning conditions of the ordered trade itself;
   a set of predefined acceptable trade details; and
   software executing on said computer for comparing the party supplied data elements contained in said trade execution information with the party supplied data elements contained in said trade allocation information, and for determining that a match exists if the party supplied data elements contained in said trade execution information and the party supplied data elements contained in said trade allocation information correlate within said set of predefined acceptable trade details;
   wherein if a match is not found to exist, software executing on said computer generates and transmits an exception notification to the first trading party and the second trading party informing them that an exception has been detected, and further comprising software executing on said computer for receiving an instruction for exception processing from at least one of the first trading party and the second trading party, and for processing the exception according to the instruction for exception processing;
   wherein the instruction for exception processing comprises an instruction to force the match, and wherein the system continues processing the trade.

2. The system of claim 1 wherein said set of predefined acceptable trade parameters is dependent on the identities of the first trading party and the second trading party.

3. The system of claim 1 further comprising:
   a database of trading party profiles accessible by said computer;
   wherein said trade execution information includes a first trading party identification and said trade allocation information includes a second trading party identification;
   wherein software executing on said computer retrieves from said database a first trading party profile based on the first trading party identification and a second trading party profile based on the second trading party identification; and
   wherein said set of predefined acceptable trade parameters are extracted from the first trading party profile and the second trading profile.

4. The system of claim 3 wherein the first trading party profile is dependent on both the first trading party identification and the second trading party identification and wherein the second trading party profile is dependent on both the second trading party identification and the first trading party identification.

5. The system of claim 3 wherein the first trading party profile is dependent on the first trading party identification and independent of the second trading party identification and wherein the second trading party profile is dependent on the second trading party identification and independent of the first trading party identification.

6. The system of claim 3 further comprising software executing on said computer for allowing the first trading party to access, modify and confirm the first trading party profile and for allowing the second trading party to access, modify and confirm the second trading party profile.

7. The system of claim 1:
   wherein the party supplied data elements contained in said trade execution information and the party supplied data elements contained in said trade allocation information include minimum pairing data;
   further comprising software executing on said computer for comparing the party supplied data elements contained in said trade execution information with the party supplied data elements contained in said trade allocation information, said software determining that a pairing exists if the minimum pairing data of the party supplied data elements contained in said trade execution information corresponds to the minimum pairing data of the party supplied data elements contained in said trade allocation information; and
   wherein said matching software compares trade execution information and trade allocation information only after a pairing has been found to exist.

8. The system of claim 7 wherein the minimum pairing data comprises an indicator of whether shares are being bought or sold, an indicator of a trade date, a security identification, and an indicator of the number of shares traded.

9. The system of claim 1 further comprising an affirmation generated by said computer if a match is determined to exist, the affirmation being transmitted to the first trading party and the second trading party confirming that a match has been detected by said matching software and containing all data necessary for settling the trade.

10. The system of claim 1 further comprising:
    a plurality of enrichment databases having enrichment data stored thereon; and
    software executing on said computer for enriching said trade execution information and said trade allocation information with enrichment data retrieved from said plurality of enrichment databases.

11. The system of claim 10 further comprising software executing on said computer for calculating a trade net amount if a match is determined to exist using the enriched trade execution information and the enriched trade allocation information.

12. The system of claim 10 further comprising software executing on said computer for allowing the first trading party and the second trading party to access, modify and confirm said enrichment databases.

13. The system of claim 10 wherein one of said plurality of enrichment databases comprises a commission fees database.

14. The system of claim 10 wherein one of said plurality of enrichment databases comprises a trade status database.

15. The system of claim 14 further comprising software executing on said computer for allowing the first trading party and the second trading party to access the trade status database in order to view the real-time status of the trade.

16. The system of claim 1 wherein the first trading party is a broker and wherein said trade execution information is extracted from an order execution notice received by said computer.

17. The system of claim 16 wherein the second trading party is an investment manager and wherein said trade allocation information is extracted from an allocation received by said computer.

18. The system of claim 17 further comprising software executing on said computer for extracting said trade execution information from the order execution notice and said trade allocation information from the allocation and for translating said trade execution information and said trade allocation information into a format usable by said computer.

19. A system for facilitating the processing and management of a securities trade comprising:

a computer;

trade execution information supplied by a first trading party and received by said computer, said trade execution information indicative of an executed trade by the first trading party and comprising party supplied data elements concerning conditions of the executed trade itself, including a first trading party identification and minimum pairing data;

trade allocation information supplied by a second trading party and received by said computer, said trade allocation information indicative of an ordered trade by the second trading party and comprising party supplied data elements concerning conditions of the ordered trade itself, including a second trading party identification and minimum pairing data;

a database containing a plurality of trading party profiles accessible by said computer and retrievable by trading party identification, the trading party profiles indicative of acceptable trade details;

a plurality of enrichment databases having enrichment data stored thereon;

software executing on said computer for enriching said trade execution information and said trade allocation information with data retrieved from said plurality of enrichment databases;

software executing on said computer for allowing the first trading party to access, modify and confirm the first trading party profile and said enrichment databases and for allowing the second trading party to access, modify and confirm the second trading party profile and said enrichment databases;

software executing on said computer for comparing the party supplied data elements contained in said trade execution information with the party supplied data elements contained in said trade allocation information, and for determining that a pairing exists if the minimum pairing data of the party supplied data elements contained in said trade execution information corresponds to the minimum pairing data of the party supplied data elements contained in said trade allocation information;

software executing on said computer for comparing the party supplied data elements contained in said trade execution information with the party supplied data elements contained in said trade allocation information if a pairing has been found to exist, and for determining that a match exists if the party supplied data elements contained in said trade execution information and the party supplied data elements contained in said trade allocation information correlate within the acceptable trade details supplied in the trading party profile for the first trading party and the trading party profile for the second trading party;

software executing on said computer for calculating a trade net amount if a match is determined to exist using the enriched trade execution information and the enriched trade allocation information; and an affirmation generated by said computer if a match is determined to exist, the affirmation being transmitted to the first trading party and the second trading party confirming that a match has been detected and containing all data necessary for settling the trade;

wherein if a match is not found to exist, software executing on said computer generates and transmits an exception notification to the first trading party and the second trading party informing them that an exception has been detected, and further comprising software executing on said computer for receiving an instruction for exception processing from at least one of the first trading party and the second trading party, and for processing the exception according to the instruction for exception processing;

wherein the instruction for exception processing comprises an instruction to force the match, and the system continues processing the trade.

20. The system of claim 19 wherein one of said plurality of enrichment databases comprises a trade status database.

21. The system of claim 20 further comprising software executing on said computer for allowing the first trading party and the second trading party to access the trade status database in order to view the real-time status of the trade.

22. The system of claim 19 wherein the trading party profile for each of the first trading party and the second trading party is dependent on the identity of the trading party for which the profile is received.

23. The system of claim 19 wherein the first trading party profile is dependent on both the first trading party identification and the second trading party identification and wherein the second trading party profile is dependent on both the second trading party identification and the first trading party identification.

24. The system of claim 19 wherein the first trading party profile is dependent on the first trading party identification and independent of the second trading party identification and wherein the second trading party profile is dependent on the second trading party identification and independent of the first trading party identification.

25. The system of claim 19 wherein the minimum pairing data comprises an indicator of whether shares are being bought or sold, an indicator of a trade date, a security identification, and an indicator of the number of shares traded.

26. The system of claim 19 wherein each of the plurality of trading party profiles include an indication of a desired affirmation format and protocol, and further comprising software executing on said computer for translating the affirmation into the desired affirmation format and protocol specified in the first trading party profile before transmitting the affirmation to the first trading party and into the desired affirmation format and protocol specified in the second trading party profile before transmitting the affirmation to the second trading party.

27. The system of claim 19 wherein one of said plurality of enrichment databases comprises a commission fees database.

28. The system of claim 19 wherein the first trading party is a broker and wherein said trade execution information is extracted from an order execution notice received by said computer, and wherein the second trading party is an investment manager and wherein said trade allocation information is extracted from an allocation received by said computer.

29. The system of claim 28 further comprising software executing on said computer for extracting said trade execution information from the order execution notice and said trade allocation information from the allocation, and for translating said trade execution information and said trade allocation information into a format usable by said computer.

30. The system of claim 1 wherein said set of predefined acceptable trade parameters specify at least one variance range, which variance range is greater than zero, and wherein a match is determined to exist for a particular party supplied data element if the value of the particular party supplied data element contained in said trade execution information correlates with the value of the particular party supplied data element contained in said trade allocation information within the at least one variance range.

31. The system of claim 19 wherein said set of predefined acceptable trade parameters specify at least one variance range, which variance range is greater than zero, and wherein a match is determined to exist for a particular party supplied data element if the value of the particular party supplied data element contained in said trade execution information correlates with the value of the particular party supplied data element contained in said trade allocation information within the at least one variance range.

\* \* \* \* \*